United States Patent [19]

Betts et al.

[11] Patent Number: 5,708,229
[45] Date of Patent: Jan. 13, 1998

[54] GUN LAUNCH ROCKET PROPELLANT SUPPORT FILLER

[75] Inventors: Robert E. Betts; Samuel Zeman, both of Huntsville, Ala.

[73] Assignee: The United States of America as represented by the Secretary of the Army, Washington, D.C.

[21] Appl. No.: 777,162

[22] Filed: Dec. 26, 1996

[51] Int. Cl.$^6$ ............... F02K 9/10; F02K 9/32
[52] U.S. Cl. ............... 102/374; 102/380; 102/289; 89/1.813
[58] Field of Search ............... 102/381, 374, 102/380, 376, 285, 287, 283, 290, 289; 89/1.812, 1.813, 1.8, 1.701

[56] References Cited

U.S. PATENT DOCUMENTS

| | | | |
|---|---|---|---|
| 3,908,364 | 9/1975 | Lefebvre et al. | 60/252 |
| 4,459,915 | 7/1984 | Lynch | 102/374 |
| 4,856,276 | 8/1989 | Solberg | 60/250 |
| 5,099,764 | 3/1992 | Dale et al. | 102/374 |
| 5,386,776 | 2/1995 | Hatch et al. | 102/290 |

*Primary Examiner*—Michael J. Carone
*Assistant Examiner*—Christopher K. Montgomery
*Attorney, Agent, or Firm*—Hugh P. Nicholson; Freddie M. Bush

[57] ABSTRACT

A gun launched rocket motor is provided with a filler material to fill all of the free volume in the rocket with a void-free incompressible "filler". The described filler material is selected from a solid, semi-solid, or liquid having many properties closely comparable to the rocket propellant, especially match the density, chemical compatibility, coefficient of thermal expansion, and thermal stability. The filler material functions to provide the required physical support to various propellants to survive gun launch. A preferred filler material is a completely fluorinated organic material which is a liquid which is compatible with various solid rocket propellants and can readily be ejected from the chamber by pressurization from conventional igniters or combustible cords such as Rapid Deflagrating Cord, RDC. These completely fluorinated perfluoro compounds, which are designated as C5–18 compounds, are marketed as Fluorinert Brand Electronic Liquids by 3M Corporation, St. Paul, Minn. More specifically, the Fluorinert liquid compound, which is designated as FC-77, has a density of 1.78 g/ml which matches highly aluminized composite rocket propellants. FC-77 has a desirably high boiling point (97° C.), low temperature pour point (−110° C.), and a coefficient of thermal expansion of 0.0014 ml/ml° C. which is lower than many organic liquids and comparable to solid propellants. The family of Fluorinert compounds available from 3M Corporation have properties that cover a wide area providing matching properties such as densities of solid propellants for most, if not all gun boosted applications.

3 Claims, 1 Drawing Sheet

GUN LAUNCH ROCKET PROPELLANT SUPPORT FILLER

The invention described herein may be manufactured, used, and licensed by or for the Government for governmental purposes without the payment to us of any royalties thereon

BACKGROUND OF THE INVENTION

The field of this invention relates to gun launching of a solid propellant rocket, and particularly, to a method to enable the solid propellant rocket to survive gun launch from artillery such as 120 mm, 155 mm, and other caliber guns. A number of tactical advantages can be achieved by launching a solid propellant rocket from a gun in such a manner that the rocket and its propellant are protected from the heat, shock, high pressure, and accelerations involved. After the rocket leaves the muzzle of the gun, it can be ignited and flown as a guided or unguided projectile with greater range than could be achieved by an unpowered projectile.

However, the pressure and forces involved in the launch of projectiles from artillery such as 120 mm, 155 mm and other caliber guns are so great that conventional solid propellant rocket motors cannot survive this environment. Some of the problems that are encountered in gun launched rockets, depending on the specific design, include the following:

1. The motor case and projectile exterior must be designed in such a manner that high pressure; e.g., 50,000 psi, will not crush it and internal pressure will not cause it to rupture when the rocket exits the gun.

2. The rocket propellant must be sealed off from the hot, high pressure gun gases to prevent premature ignition of the propellant. The latter event would result in structural failure of the rocket.

3. The design of solid propellant rockets requires that free volume be provided, typically, in the center port of the propellant grain, for flow of gases toward the nozzle. However, upon firing of the gun, the rocket projectile is subjected to extremely high axial acceleration forces; e.g., 25,000 g which act upon the solid propellant grain. These forces cause the propellant to deform and slump into the aft end, which results in debonding from the case wall and further causes general cracking and breakup. Subsequent ignition of a rocket with this condition, after muzzle exit, would result in catastrophic failure.

A solution to the survival problems, posed by gun launch, requires that the extremely high gun chamber pressure, existing at the base (aft end) of the rocket projectile, be essentially equalized between the exterior and interior of the rocket chamber. Since hot gases must not be permitted to enter the rocket chamber, the internal pressurization must occur through some other medium called a "filler".

If all of the free volume in the center port of the propellant grain (and nozzle) is filled with an incompressible, inert material, gun pressure can be transmitted through the arc end of the rocket to offset the external pressure.

However, additional consideration is necessary to provide an offset to the axial acceleration loads on the propellant. Also, if, as is common, the rocket projectile must spin, the propellant is subjected to severe radial acceleration depending on the spin rate and the diameter of the projectile. As the spin rate and design diameter of the projectile increase, the radial acceleration increases, and this normally causes propellant deformation to the point of structural failure.

BRIEF SUMMARY OF THE INVENTION

A gun launched rocket motor is provided with a filler material to fill all of the free volume in the rocket with a void-free incompressible "filler". The described filler material is selected from a solid, semi-solid, or liquid having many properties closely comparable to the rocket propellant, especially density, chemical compatibility, coefficient of thermal expansion, and thermal stability. The filler material functions to provide the required physical support to various propellants to survive gun launch. The filler material is selected to match the density of the rocket propellant, and thus provide equalizing forces to offset the gun barrel environment. A preferred filler material is a liquid that is compatible with various solid rocket propellants and can readily be ejected from the chamber by pressurization from conventional igniters or combustible cords such as Rapid Deflagrating Cord, RDC. A preferred specific material is further described as completely fluorinated organic compounds. These are perfluoro compounds, C5–18, and marketed as Fluorinert Brand Electronic Liquid by 3M Corporation, St. Paul, Minn. More specifically, the Fluorinert liquid designated FC-77 has a density of 1.78 g/ml which matches highly aluminized composite rocket propellants. This material has a desirably high boiling point (97° C.), low temperature pour point (–110° C.), and a coefficient of thermal expansion of 0.0014 ml/ml° C. which is lower than many organic liquids and comparable to solid propellants. The family of Fluorinert compounds available from 3M Corporation have properties that cover a wide area providing matching properties such as densities of solid propellants for most, if not all gun boosted applications.

DETAILED DESCRIPTION OF THE INVENTION

Figure 1:
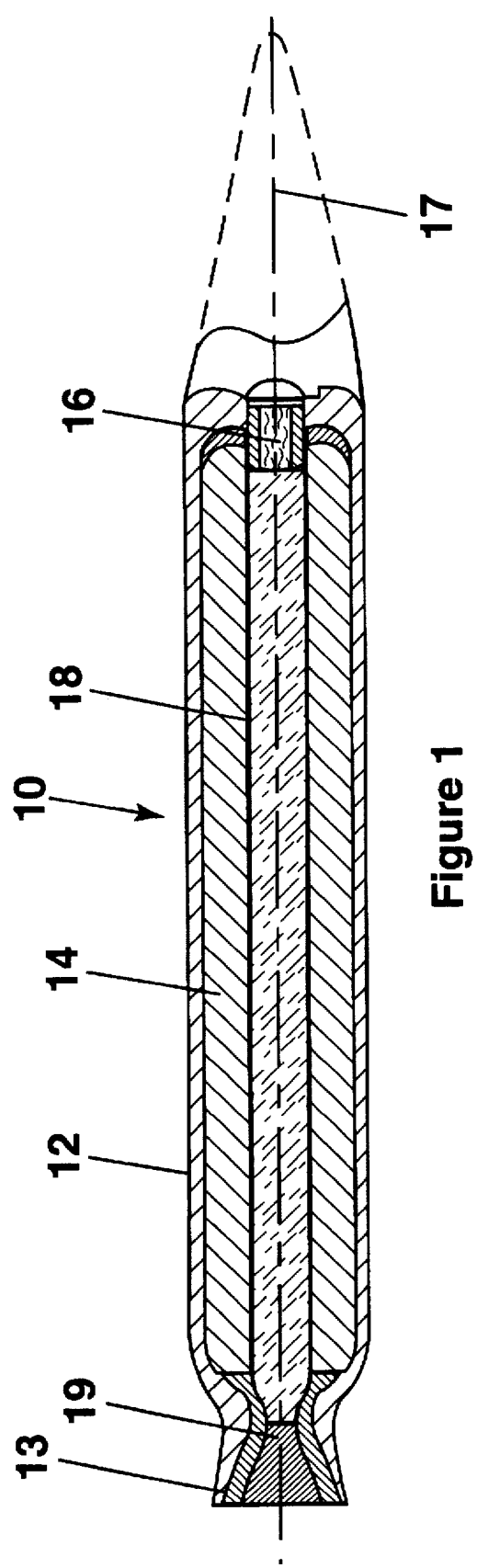
FIG. 1 is a gun launched rocket motor 10 with filler material installed before launching.

A solution to the survival problems, posed by gun launch, requires that the extremely high gun chamber pressure, existing at the base (aft-end) of the rocket projectile, be essentially equalized between the exterior and interior of the rocket chamber. Since hot gases must not be permitted to enter the rocket chamber, the internal pressurization must occur through some other medium called a "filler".

If all of the free volume in the center port of the propellant grain (and nozzle) is filled with an incompressible, inert material, gun pressure can be transmitted through the aft end of the rocket to offset the external pressure.

However, additional consideration is necessary to provide an offset to the axial acceleration loads on the propellant. Also, if, as is common, the rocket projectile must spin, the propellant is subjected to severe radial acceleration depending on the spin rate and the diameter of the projectile. As the spin rate and design diameter of the projectile increase, the radial acceleration increases, and this normally causes propellant deformation to the point of structural failure.

It would be possible to fill all of the free volume in the rocket with a void-free incompressible "filler". Such a filler could provide support to the propellant and prevent its deformation, debonding, rupture, and breakup. The filler could be a solid, semi-solid, or liquid, but it would have to meet numerous requirements in order to perform its function. These requirements could, however, be summarized in a few sentences by stating that the "filler" has to have many properties closely comparable to the rocket propellant, especially density, chemical compatibility, coefficient of thermal expansion, and thermal stability.

Based on the above discussion, a "filler", if properly formulated, could provide support to a rocket propellant grain during gun launch. However, a key requirement, not previously identified, is that the filler material must be easily and rapidly removable from the rocket chamber in such a manner that the propellant surface is not inhibited and can be ignited by conventional means without delay. For example, if an inert propellant formulation, containing a salt and a polymeric binder, is used as a filler, it may provide support to the propellant, depending on its density and other properties, but it cannot be expelled from the chamber without causing undesirable effects. If ignition materials including pyrotechnics or combustible cords, such as Rapid Deflagrating Cord, RDC, are installed between the "active" propellant and "filler" material, some of the filler may be expelled upon actuation whereas much of it may act as an inhibitor, preventing proper propellant ignition. In general, the polymeric solid filler would be difficult to eject, causing catastrophic pressures or unacceptable pressure/thrust time performance as the filler blocked the port area of the rocket motor.

The object of this invention is to identify a class of materials, which when employed as the fillers will provide the required physical support to various propellants to survive gun launch. These materials match the density of the rocket propellant, and thus provide equalizing forces to offset the gun barrel environment. In addition, the object of this invention is a liquid that is compatible with various solid rocket propellants and can readily be ejected from the chamber by pressurization from conventional igniters or combustible cords such as Rapid Deflagrating Cord, RDC.

The filler materials that are the object of this invention are completely fluorinated organic compounds. These are perfluoro compounds, C5–18, and marketed as Fluorinert Brand Electronic Liquid by 3M Corporation, St. Paul, Minn. More specifically, the Fluorinert liquid designated FC-77 has a density of 1.78 g/ml which matches highly aluminized composite rocket propellants. This material has a desirably high boiling point (97° C.), low temperature pour point (−110° C.), and a coefficient of thermal expansion of 0.0014 ml/ml° C. which is lower than many organic liquids and comparable to solid propellants.

The family of Fluorinert compounds available from 3M Corporation have properties that cover a wide area providing matching properties such as densities of solid propellants for most, if not all gun boosted applications.

Figure 2:
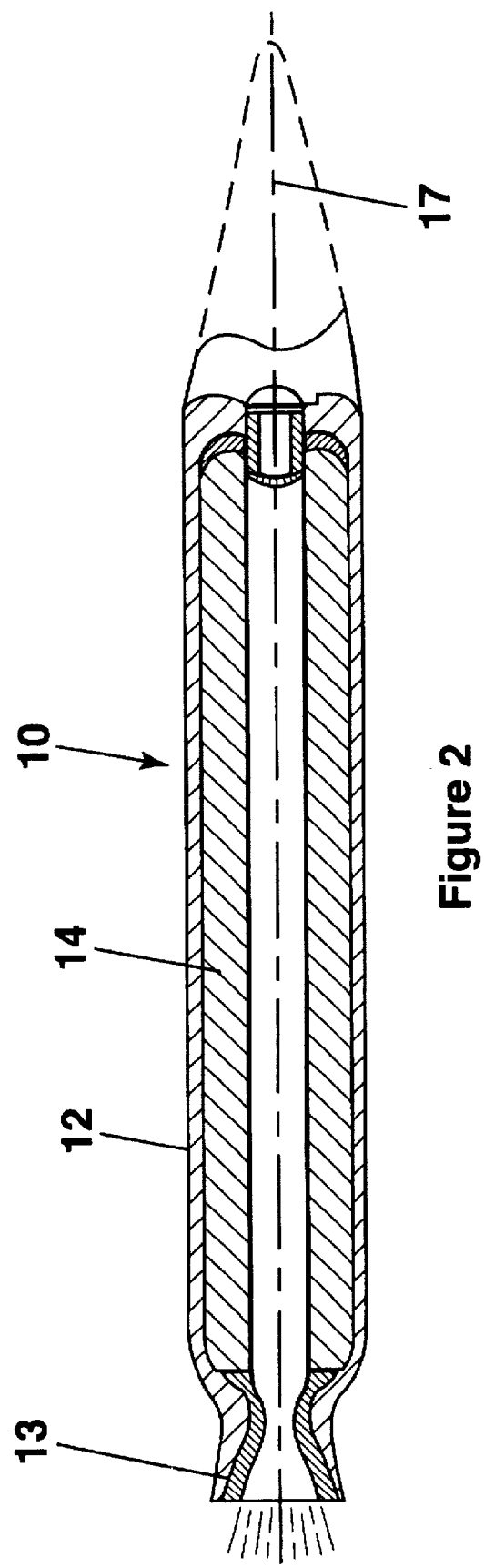
FIG. 2 is a gun launched rocket motor 10 after igniter actuation and filler expulsion.

In further reference to the Figures of the drawing, FIG. 1 depicts a solid propellant rocket 10 with a solid propellant composition 14 installed within a solid propellant rocket case 12 having a forward-end and an aft-end. A nozzle 13 is shown affixed at the aft-end of the case. An igniter 16 is shown installed at the forward end of the rocket. This igniter is designed to withstand gun launch pressures exceeding 50,000 psi. An inert, non-compressible filler material 18 is shown filling all of the free space surrounding a center line 17 of the solid propellant rocket and filling all of the free space which is defined by the solid propellant composition, the igniter, and a nozzle plug 19. FIG. 2 depicts the solid propellant rocket 10 after nozzle plug removal and expulsion of the liquid filler material.

A test fixture for the evaluation of using a completely fluorinated organic compound (Fluoroinert) as the filler material under high pressure conditions comprised an igniter body for containing propellant and a port for inserting an M3-squib which was subsequently sealed with 732-RTV (room temperature vulcanizing, rubber compound). A center aluminum support rod, employed in a design with free volume surrounding the aluminum support rod for containing the filler within a tube member (Plexiglas tube), is secured to the igniter body. An end cap is provided for the tube member to permit testing under high pressure such as is experience under rocket gun launch environment conditions. The igniter body is provided with a filler tube for introducing the filler into the free volume. The igniter body is provided with a vent hole so that any air can be released to ascertain that the free volume is completely filled with the filler. No air bubble can be tolerated since compression of an air bubble could cause a tremendous increase in temperature which could result in ignition of propellant prior to exit from a gun launch muzzle thereby resulting in a catastropic condition and failure of a solid propellant rocket during gun launch. After completely filling the free volume with filler, RTV rubber is employed to seal the vent hole thereby permitting pressure to be applied to the igniter body.

The described test fixture was tested with firing of the squib and pellets. The performance of the Fluoroinert compound as an inert, non-compressible filler was confirmed as a preferred filler material for use as disclosed for gun launch rocket propellant support filler.

As is established or common practice, a filler tube and and a vent hole or opening (not shown) is provided for the nozzle plug to ascertain that all free volume is filled with filler and any air bubbles are released. The filler tube opening and vent hole are sealed by RTV rubber so that full pressure is applied at the aft-end of the rocket during gun launch without a leakage of gaseous products to internals of rocket but resulting in constant external and internal pressure of the rocket during launch which enable the rocket to easily eject the nozzle plub as planned by the method of this invention.

The solid propellant rocket can have variable internal designs so long as the design includes a free volume for containing the flier material so that under gun launch pressure conditions, the solid propellant composition survives. The flier material is easily expelled after gun launch of the rocket as disclosed hereinabove.

As indicated previously, the function of the proposed. Fluorinert liquid is to serve as a void-free "filler" in the center bore, to occupy the free volume of a solid propellant rocket under the dynamic conditions encountered in gun launch. After exit from the gun, the liquid can be expelled either "on command" or through the natural forces involved in the launch process by ejecting a nozzle plug. Natural forces involved in the launch process result in expelling of nozzle plug 19 by internal pressure exceeding 50,000 psi to the lower pressure outside the gun barrel and the rocket nozzle. This expelling of the nozzle plug can also take place simultaneously with igniter actuation following exit from the muzzle of the launch gun (not shown). The liquid will drain by natural forces from the free space and surface of the propellant composition. Conventional time delayed ignition devices can then be used to ignite the rocket that is already flying at a high velocity. The "on command" technique comprises firing the igniter which exerts force on the filler which moves as a piston to force the nozzle plug out of the nozzle and the filler as well, and the igniter simultaneously ignites propellant surfaces progressively toward the exit nozzle. The ignition and liquid ejection mechanisms may be part of a single process, and the inert, free from debris, non-combustible filler is readily removed from the rocket port area. The ignition process can be delayed by employing time delay ignition devices to ignite the propellant composition of the solid propellant rocket after it is flying at a high velocity.

We claim:

1. The method of enabling a solid propellant rocket to survive gun launching by protecting said solid propellant rocket and its propellant from the heat, shock, high pressure, and acceleration forces involved during launch to thereby permit said solid propellant rocket after leaving the nozzle of the gun to be ignited and flown as a guided or unguided rocket to deliver a projectile with a greater range than could be achieved by unpowered gun launched projectile, said method comprising:

(i) providing a solid propellant rocket comprising:

(a) a solid propellant rocket case having a designated centerline extending from a forward-end of said solid propellant rocket through a nozzle affixed at the aft-end of said solid propellant rocket;

(b) a solid propellant composition disposed in said solid propellant rocket case around the inner surface thereof to provide a free volume surrounding said centerline;

(c) a nozzle affixed at the aft-end of said solid propellant rocket; and, (d) igniter means for igniting said solid propellant;

(ii) providing a filler material to fill all of said free volume, said filler material comprising a void-free incompressible filler for providing support to said solid propellant composition and for preventing said solid propellant composition deformation, debonding, rupture, and breakup, said filler material selected from completely fluorinated organic compounds having many chemical and physical properties closely comparable to the chemical and physical properties of said solid propellant composition, said chemical and physical properties including a density of about 1.78 g/ml, a desirably high boiling point of about 97° C., a low temperature pour point of about −110° C., and a coefficient of thermal expansion of about 0.0014 ml/ml° C.;

(iii) providing a removable nozzle plug disposed in said nozzle for containing said filler in said free volume during gun launch;

(iv) ejecting said nozzle plug after said solid propellant rocket exits from a launch gun to thereby achieve the ejection of said nozzle plug and the expulsion of said filler through the natural forces involved in the launch process by ejecting said nozzle plug prior to ignition of said solid propellant composition; and, (v) subsequently igniting said solid propellant composition.

2. The method as defined in claim 1 wherein said igniter means for said solid propellant composition employs time delay ignition devices to ignite said solid propellant composition in said solid propellant rocket after ejection of said filler and after said solid propellant rocket is already flying at a high velocity.

3. The method of enabling a solid propellant rocket to survive gun launching by protecting said solid propellant rocket and its propellant from the heat, shock, high pressure, and acceleration forces involved during launch to thereby permit said solid propellant rocket after leaving the nozzle of the gun to be ignited and flown as a guided or unguided rocket to deliver a projectile with a greater range than could be achieved by unpowered gun launched projectile, said method comprising:

(i) providing a solid propellant rocket comprising:

(a) a solid propellant rocket case having a designated centerline extending from a forward-end of said solid propellant rocket through a nozzle affixed at the aft-end of said solid propellant rocket;

(d) igniter means for igniting said solid propellant;

(ii) providing a filler material to fill all of said free volume, said filler material comprising a void-free incompressible filler for providing support to said solid propellant composition and for preventing said solid propellant composition deformation, debonding, rupture, and breakup, said filler material selected from completely fluorinated organic compounds having many chemical and physical properties closely comparable to the chemical and physical properties of said solid propellant composition, said chemical and physical properties including a density of about 1.78 g/ml, a desirably high boiling point of about 97° C., a low temperature pour point of about −110° C., and a coefficient of thermal expansion of about 0.0014 ml/ml ° C.;

(iii) providing a removable nozzle plug disposed in said nozzle for containing said filler in said free volume during gun launch; and, (iv) actuating of said igniter means immediately after said solid propellant rocket exits from said launch gun to thereby exert force on said filler which moves as a piston to force said nozzle plug out of said nozzle and said filler through said nozzle, said igniter means simultaneously igniting propellant surfaces progressively toward said nozzle affixed at the aft-end of said solid propellant rocket.

* * * * *